United States Patent [19]

Sato

[11] Patent Number: 5,099,190
[45] Date of Patent: Mar. 24, 1992

[54] REACTIVE POWER COMPENSATION APPARATUS

[75] Inventor: Naoko Sato, Tokyo, Japan

[73] Assignee: Kabushiki Kaisha Toshiba, Kawasaki, Japan

[21] Appl. No.: 635,972

[22] Filed: Dec. 31, 1990

[30] Foreign Application Priority Data

Jan. 16, 1990 [JP] Japan ................................ 2-4516
Jan. 16, 1990 [JP] Japan ................................ 2-4517

[51] Int. Cl.$^5$ ............................ H02J 3/18; G05F 1/70
[52] U.S. Cl. ................................................. 323/210
[58] Field of Search ............... 323/205, 208, 209, 210, 323/211

[56] References Cited

U.S. PATENT DOCUMENTS

| | | |
|---|---|---|
| 4,472,674 | 9/1984 | Yano et al. ............ 323/210 |
| 4,496,899 | 1/1985 | Lippitt et al. ............ 323/210 |
| 4,546,303 | 10/1985 | Maeda et al. ............ 323/210 |
| 4,602,206 | 7/1986 | Walker ............ 323/211 |
| 4,891,570 | 1/1990 | Nakamura et al. ............ 323/210 |
| 4,897,593 | 1/1990 | Konishi et al. ............ 323/210 |

FOREIGN PATENT DOCUMENTS 57-132734 8/1982 Japan .

Primary Examiner—Peter S. Wong
Attorney, Agent, or Firm—Oblon, Spivak, McClelland, Maier & Neustadt

[57] ABSTRACT

A reactive power compensation apparatus includes a power system with a given voltage, a controller for controlling the voltage of the power system to a predetermined target voltage, using a predetermined transfer function, a reactive element, a switch for connecting the reactive element to the power system, a detector for detecting an impedance of the power system in accordance with a change in the voltage of the power system, the voltage change being defined by a difference between the voltage of the power system obtained when the reactive element is connected to the power system and the voltage of the power system obtained when the reactive element is disconnected from the power system, and a circuit for changing the transfer function of the controller in accordance with the impedance detected by the detector.

15 Claims, 3 Drawing Sheets

REACTIVE POWER COMPENSATION APPARATUS

BACKGROUND OF THE INVENTION

1. Field of the Invention

The present invention relates to a control apparatus for a reactive power compensation apparatus for suppressing voltage fluctuations in a power system.

2. Description of the Related Art

In such a conventional reactive power compensation apparatus, in order to improve a transient response of a control system in terms of stability and speed, gain $K_p$ ($=(1+TpS)/TpS$) of the reactive power determining circuit (PI control circuit) is optimized in accordance with the value of power source impedance Z. However, the value of power source impedance Z is not constant and is greatly changed depending on a condition in which the power system is used. For example, the value of power source impedance Z is changed due to, e.g., a difference in condition between day and night and between seasons, and variations in condition caused by additional installation of a power plant. For this reason, if power source impedance Z is reduced under constant gain Kp, the gain of the control loop is decreased to cause a decrease in transient response speed. In contrast to this, if power source impedance Z is increased, the gain of the control loop is increased, resulting in an unstable response and hunting.

SUMMARY OF THE INVENTION

The present invention has been made to solve the above-described problems associated with fluctuations in power source impedance, and has as its object to provide a reactive power compensation apparatus which can always ensure optimal response characteristics even with fluctuations in power source impedance by estimating a power source impedance and automatically adjusting the gain (or transfer function) of a reactive power determining circuit in accordance with the estimated impedance.

The present invention includes adjusting means, responsive to an ON/OFF signal from a static capacitor (or inductor) provided for a power system together with a reactive power compensation apparatus, for calculating an estimated power source impedance value from a change in system voltage and a change in current caused upon an ON/OFF operation of the static capacitor, and adjusting a control gain (or transfer function) on the basis of the estimated value.

According to the present invention, estimated power source impedance $Z$ ($=\Delta V/\Delta I$) can be calculated by dividing a change $\Delta V$ in system voltage, caused upon an ON or OFF operation of the static capacitor, by a current change $\Delta I$ at this time. By adjusting the gain of the control means in inverse proportion to this estimated value, a highly stable reactive power control apparatus having a high response speed can be realized.

The present invention may alternatively include gain adjusting means for receiving an ON/OFF signal from a static capacitor provided for a power system together with a reactive power compensation apparatus, calculating an estimated power source impedance value from a change in system voltage, caused upon an ON/OFF operation of the static capacitor, and the capacitance of the capacitor, and adjusting a control gain on the basis of the estimated value.

According to this aspect of the present invention, estimated power source impedance $Z$ ($=\Delta V/\omega CI$) can be calculated by dividing a change $\Delta V$ in system voltage, caused upon an ON/OFF operation of the static capacitor, by capacitance C of the capacitor, i.e., a change in system current. By adjusting the gain of the control means in inverse proportion to this estimated value, a highly stable reactive power control apparatus having a high response speed can be realized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Embodiments of the present invention will be described below with reference to the accompanying drawings.

Figure 1:
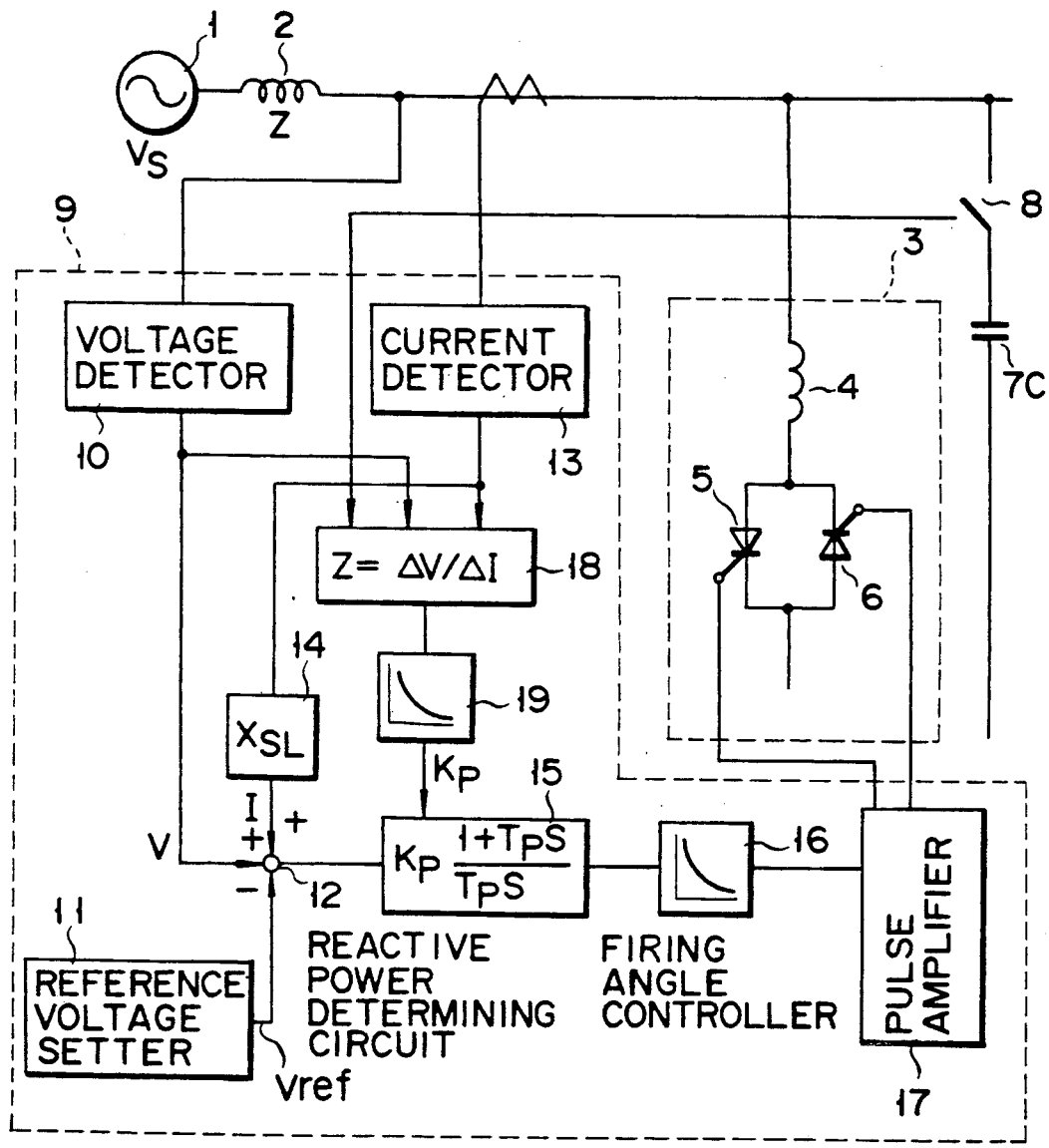
FIG. 1 is a block diagram showing an arrangement of a reactive power compensation apparatus according to an embodiment of the present invention.

FIG. 1 is a block diagram showing an embodiment of the present invention.

Referring to FIG. 1, main circuit 3, of the reactive power compensation apparatus, connected to a power system equivalently represented by AC power source 1 and power source impedance 2 is designed such that an inverse-parallel circuit consisting of thyristors 5 and 6 is connected in series with reactor 4.

In addition, static capacitor 7C is generally connected to this power system through switching circuit 8.

Control circuit 9 detects a voltage applied from the power system as detection value V by using voltage detector 10. Control circuit 9 then causes difference detector 12 to detect a difference between detection value V and reference voltage value $V_{ref}$ set in reference voltage setter 11. Meanwhile, a current from the power system is detected by current detector 13 as detection value I. Detection value I is reduced to several to a value between 10 and 20% by slope reactance circuit 14 and is input to difference detector 12.

Difference detector 12 supplies a difference output, obtained in accordance with two voltage input signals V and $V_{ref}$ and current input signal I, to reactive power determining circuit 15 constituted by an amplifier, a phase compensation circuit, and the like. Reactive power determining circuit 15 supplies a reactive power signal used for compensation, determined in accordance with the voltage difference, to firing angle controller 16 for thyristors 5 and 6, thereby generating a firing pulse to be applied to thyristors 5 and 6 of main circuit 3, with a phase corresponding to the reactive power signal. This firing pulse is applied to the gates of thyristors 5 and 6 through pulse amplifier 17.

In this arrangement, when a voltage drop occurs in the power system, voltage detector 10 detects system voltage V, and a difference between voltage V and reference value $V_{ref}$ is detected by difference detector 12. This difference may be corrected on the basis of output I from current detector 13. The output signal from difference detector 12 is amplified by reactive power determining circuit 15 so as to be formed into a reactive power signal. Firing angle controller 16 then outputs a firing pulse with a phase corresponding to this signal. The firing pulse output is amplified by pulse amplifier 17 and is used to fire thyristors 5 and 6. Consequently, a delay current flowing in reactor 4 is reduced to suppress a decrease in system voltage.

In contrast to this, if the system voltage is increased, the phases of firing pulses to be applied to thyristors 5 and 6 are controlled to increase a current flowing in reactor 4. With this operation, feedback control is performed to suppress an increase in system voltage.

In FIG. 1, upon reception of an ON/OFF switching signal from capacitor 7C, power source impedance estimating circuit 18 calculates change $\Delta V$ in system voltage V and change $\Delta I$ in current I, and estimates power source impedance Z by a calculation of:

$$Z = \Delta V / \Delta I \tag{1}$$

Gain adjusting circuit 19 adjusts gain $K_p$ of reactive power determining circuit 15 in inverse proportion to estimated impedance value Z.

If estimated value Z of the power source impedance is reduced, since the transient response speed of control circuit 9 is decreased, gain $K_p$ of reactive power determining circuit 15 is increased. In contrast to this, if estimated value Z is increased, since the transient response speed of control circuit 9 is increased to cause hunting, gain $K_p$ of reactive power determining circuit 15 is deceased to stabilize the system.

Figure 2:
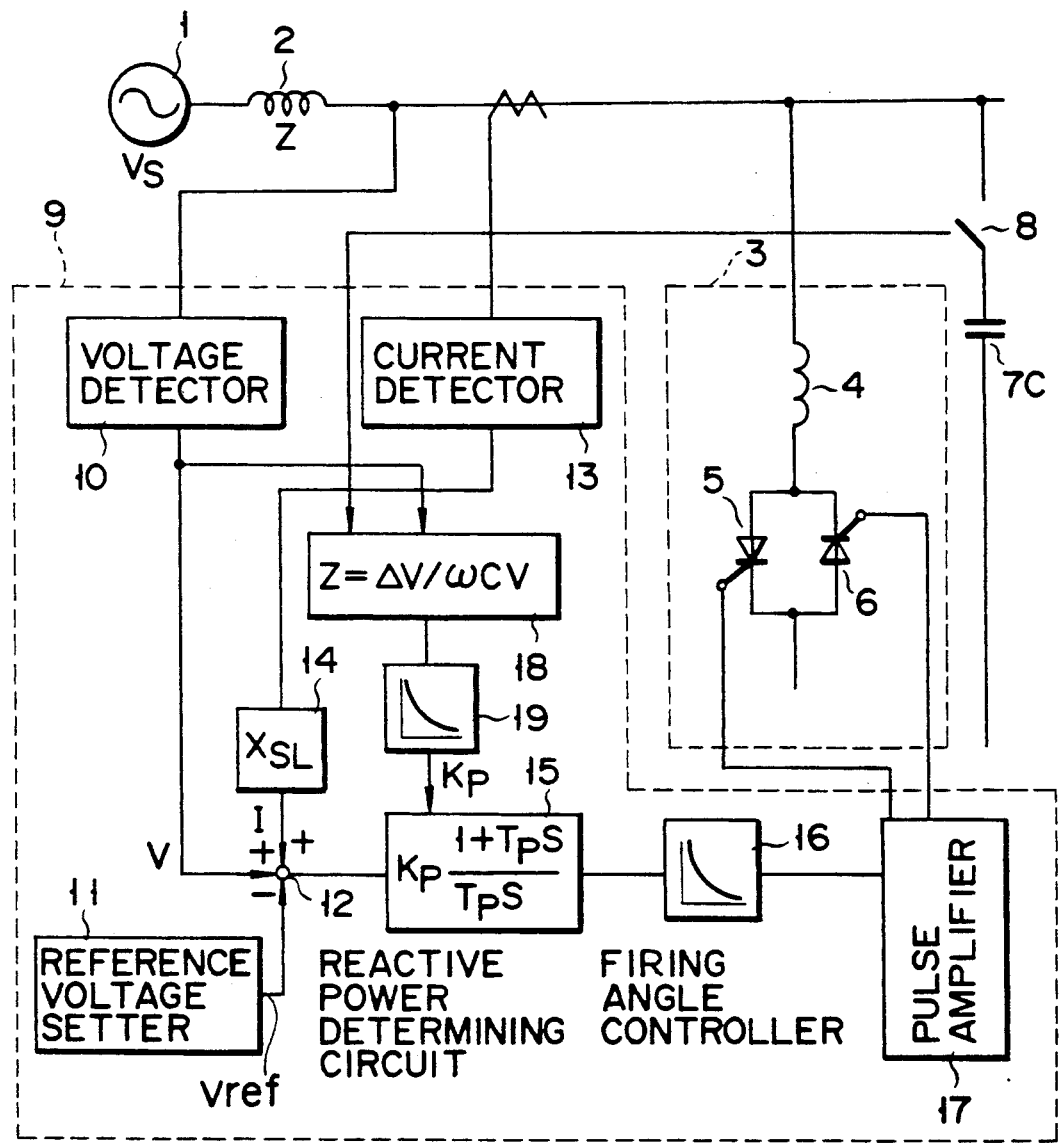
FIG. 2 is a block diagram showing an arrangement of another reactive power compensation apparatus according to the present invention.
Figure 3:
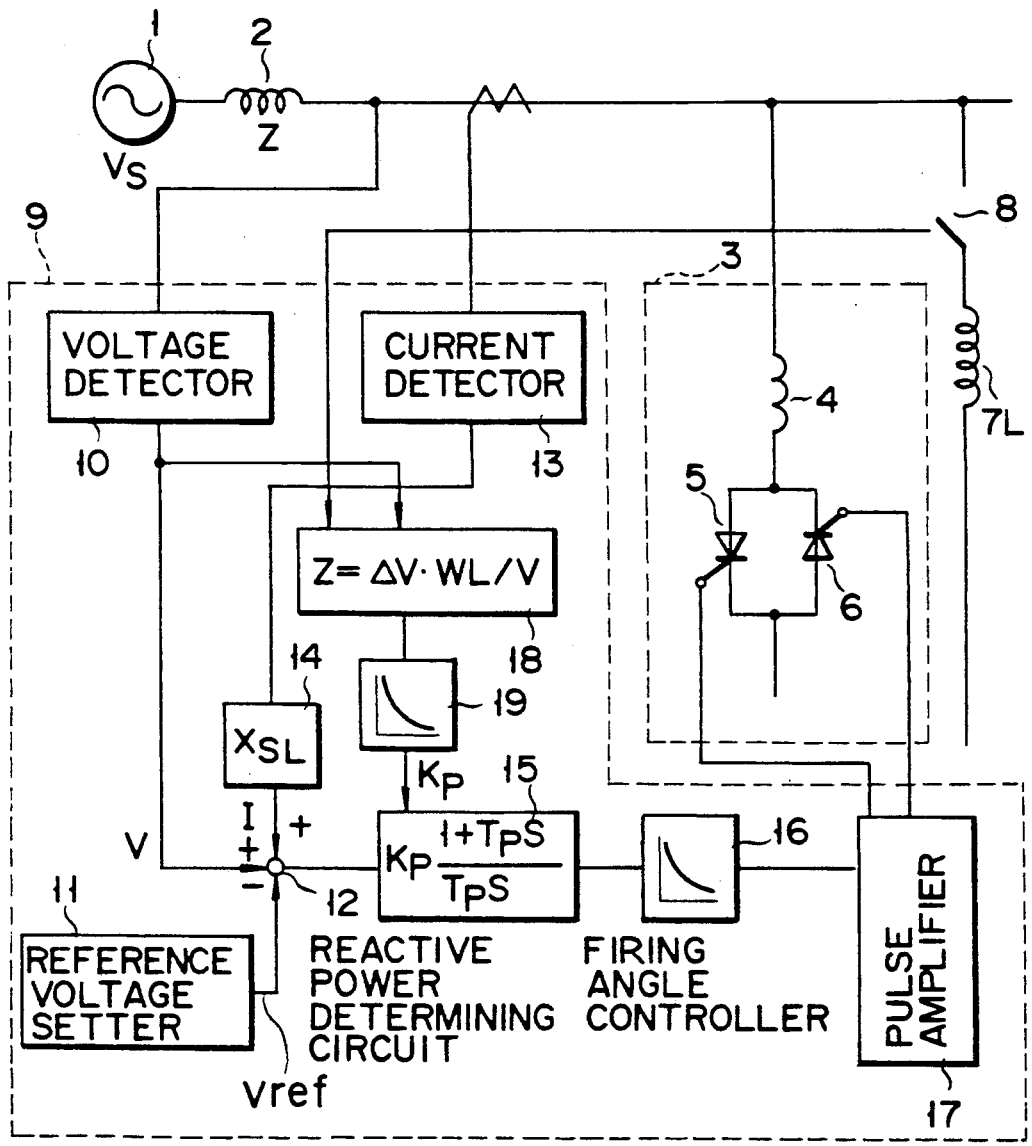
FIG. 3 is a block diagram showing still another embodiment of the present invention.

FIG. 2 is a block diagram showing another embodiment of the present invention. Referring to FIG. 3, upon reception of an ON/OFF switching signal from capacitor 7C, power source impedance estimating circuit 18 estimates power source impedance Z from change $\Delta V$ in system voltage V and capacitance C of a static capacitor according to a calculation of:

$$Z = \Delta V / \omega C V \tag{2}$$

Gain adjusting circuit 19 adjusts gain $K_p$ of reactive power determining circuit 15 in inverse proportion to estimated impedance value Z.

If estimated value Z of the power source impedance is reduced, since the transient response speed of control circuit 9 is decreased, gain $K_p$ of reactive power determining circuit 15 is increased. In contrast to this, if estimated value Z is increased, since the transient response speed of control circuit 9 is increased to cause hunting, gain $K_p$ of reactive power determining circuit 15 is decreased to stabilize the system.

The apparatus shown in FIG. 1 or 2 may be replaced with a reactive power compensation apparatus (Thyristor Switched Capacitor: TSC) in which capacitor 7C is turned on and off by a thyristor switch, and an impedance is obtained from a system voltage and the capacitance of the capacitor of the TSC upon turning on or off of the TSC, thus adjusting the gain in the same manner as in the above embodiment.

FIG. 3 is a block diagram showing still another embodiment of the present invention. Referring to FIG. 3, upon reception of an ON/OFF switching signal from inductor 7L, power source impedance estimating circuit 18 estimates power source impedance Z from change $\Delta V$ in system voltage V and inductance L of inductor 7L according to a calculation of:

$$Z = \Delta V \cdot \omega L / V \tag{3}$$

Gain adjusting circuit 19 adjusts gain $K_p$ of reactive power determining circuit 15 in inverse proportion to estimated impedance value Z.

If estimated value Z of the power source impedance is reduced, since the transient response speed of control circuit 9 is decreased, gain $K_p$ of reactive power determining circuit 15 is increased. In contrast to this, if estimated value Z is increased, since the transient response speed of control circuit 9 is increased to cause hunting, gain $K_p$ of reactive power determining circuit 15 is decreased to stabilize the system.

Incidentally, power source impedance estimating circuit 18 can be reduced to practice by a microcomputer, using a software programmed for aforementioned equation (1), (2), or (3).

In each embodiment of FIGS. 1 to 3, proportional constant (gain) Kp in the transfer function of reactive power determining circuit 15 is changed in accordance with power source impedance Z obtained by estimating circuit 18 (i.e., Kp decreases as Z increases). However, there are alternative methods as follows:

1) time constant Tp in the transfer function of circuit 15 is changed in response to a change in impedance Z (Tp increases as Z increases);
2) reactance $X_{SL}$ of slope reactance circuit 14 is changed in response to a change in impedance Z ($X_{SL}$ increases as Z increases so that detected current value I decreases);
3) combining above 1) and/or 2) with the embodiment of FIG. 1, etc., so that two more parameters in Kp, Tp, and $X_{SL}$ are changed in response to a change in impedance Z obtained by circuit 18.

Although each control of the above 1), 2), and 3) can be achieved by a software control using a CPU, these controls can also be achieved by use of an exclusive hardware.

As has been described above, according to the present invention, even if a change in power source impedance occurs in accordance with a condition in which the power system is used, since the control system automatically adjusts its gain, high-speed, stable control of reactive power can be performed, thus providing a highly reliable reactive power compensation apparatus.

Additional advantages and modifications will readily occur to those skilled in the art. Therefore, the invention in its broader aspects is not limited to the specific details, and representative devices, shown and described. Accordingly, various modifications may be made without departing from the spirit or scope of the general inventive concept as defined by the appended claims and their equivalents.

What is claimed is:

1. A reactive power compensation apparatus comprising:
a) a power system with a given voltage;

b) means for controlling the voltage of said power system to a predetermined target voltage, using a predetermined transfer function;
c) a reactive element;
d) means for connecting said reactive element to said power system;
e) means for detecting an impedance of said power system in accordance with a change in the voltage of said power system, said voltage change being defined by a difference between the voltage of said power system obtained when said reactive element is connected to said power system and the voltage of said power system obtained when said reactive element is disconnected from said power system; and
f) means for changing said transfer function in accordance with the impedance detected by said detecting means.

2. An apparatus according to claim 1, wherein said reactive element includes a capacitor.

3. An apparatus according to claim 2, further comprising means for detecting a change in a current flowing through said power system, the current change corresponding to the voltage change of said power system,
wherein said detecting means includes means for calculating a ratio of the voltage change to the current change to obtain the impedance of said power system.

4. An apparatus according to claim 3, wherein said transfer function changing means includes means for decreasing a gain term in said predetermined transfer function in response to increase in the impedance of said power system.

5. An apparatus according to claim 3, wherein said transfer function changing means includes means for increasing a time-constant term in said predetermined transfer function in response to increase in the impedance of said power system.

6. An apparatus according to claim 3, further comprising means for modifying an error component between the power system voltage and the predetermined target voltage in response to change in the impedance of said power system.

7. An apparatus according to claim 1, wherein said reactive element includes an inductor.

8. An apparatus according to claim 7, wherein said detecting means includes means for calculating a voltage change ratio of the change in the power system voltage to the power system voltage, and obtaining the impedance of said power system in accordance with said voltage change ratio and an impedance value of said inductor.

9. An apparatus according to claim 8, wherein said transfer function changing means includes means for decreasing a gain term in said predetermined transfer function in response to increase in the impedance of said power system.

10. An apparatus according to claim 8, wherein said transfer function changing means includes means for increasing a time-constant term in said predetermined transfer function in response to increase in the impedance of said power system.

11. A reactive power compensation apparatus comprising:
a power system with a given voltage;
means for controlling the voltage of said power system to a predetermined target voltage, using a predetermined transfer function;
a reactive element;
means for connecting said reactive element to said power system; and
means for changing said transfer function in accordance with a change in the voltage of said power system, said voltage change being defined by a difference between the voltage of said power system obtained when said reactive element is connected to said power system and the voltage of said power system obtained when said reactive element is disconnected from said power system.

12. An apparatus according to claim 11, wherein said transfer function changing means includes means for increasing a time-constant term in said predetermined transfer function in response to increase in the voltage change of said power system.

13. An apparatus according to claim 11, further comprising means for modifying an error component between the power system voltage and the predetermined target voltage in response to the voltage change of said power system.

14. A reactive power compensation apparatus comprising:
a main circuit having a reactor and anti-parallel-connected switching elements coupled to a power system;
control means for phase-controlling said switching elements with a given gain so as to maintain a voltage of the power system at a reference voltage value;
means for, when a signal of an ON/OFF operation is received from a static capacitor connected in parallel to said reactive power compensation apparatus, estimating a power source impedance value by dividing a system voltage change by a change in output current of the power system, which changes are detected as changes caused by the ON/OFF operation of said static capacitor; and
means for adjusting the given gain of said control means on the basis of the estimated power source impedance value.

15. A reactive power compensation apparatus comprising:
a main circuit having a reactor and an anti-parallel-connected switching elements coupled to a power system;
control means for phase-controlling said switching elements with a given gain so as to maintain a voltage of the power system at a reference voltage value;
means for, when a signal of an ON/OFF operation is received from a static capacitor connected in parallel to said reactive power compensation apparatus, estimating a power source impedance value from a system voltage change detected as a change caused by the ON/OFF operation of said static capacitor, and from a capacitance of said static capacitor upon the ON/OFF operation; and
means for adjusting the given gain of said control means on the basis of the estimated power source impedance value.

* * * * *